United States Patent Office 2,964,508
Patented Dec. 13, 1960

2,964,508

PROCESS FOR CONTROLLING THE MOLECULAR WEIGHT OF VINYLIDENE CHLORIDE POLYMERS

Marion R. Rector and William E. Cohrs, Midland, Mich., assignors to The Dow Chemical Company, Midland, Mich., a corporation of Delaware No Drawing. Filed June 23, 1955, Ser. No. 517,663

6 Claims. (Cl. 260—87.7)

This invention relates to a process for controlling the molecular weight of polymers. More particularly, it relates to a process for preparing vinylidene chloride polymers and copolymers having lower molecular weights than similar polymers prepared at the same temperatures but using prior known processes.

Vinylidene chloride polymers and copolymers of vinylidene chloride with another copolymerizable monomer such as vinyl chloride have been fabricated into a wide variety of useful articles. One of the most common methods of fabricating such articles is to melt the polymer and express it through a suitably shaped die orifice. The ease with which the molten polymer may be forced through the die orifice is dependent upon the flow viscosity of the molten polymer. In general, the lower the flow viscosity for a given polymer the easier it will be to force it through the die orifice. For linear polymers the flow viscosity is directly related to molecular weight. It is likewise true that for linear polymers the physical properties of articles produced from the polymer are related to and dependent upon the molecular weight of the polymer. For example, the tensile strength of a film or filament prepared from a linear polymer will usually be greater with high molecular weight polymers than with low molecular weight polymers. Consequently, a compromise must be found as to the optimum molecular weight desired. As a further complication the molecular weight of a linear polymer is dependent upon the particular polymerization conditions under which it is made. Thus, the polymerization conditions which are the most economically favorable will not always provide a polymer with the optimum molecular weight for fabrication. In prior methods of controlling the molecular weight of polymers various compounds having chain transfer activity have been added to the polymerization charge. Without exception, however, those compounds having such activity have retarded the rate of polymerization to the extent that they were not practical for commercial production or had a deleterious effect on the resulting polymer.

The provision of a process for controlling the molecular weight of linear vinylidene chloride polymers is the principal object of this invention.

It is a further object to provide such a process which will not appreciably affect the rate of polymerization.

The above and related objects are accomplished by means of a process wherein a monomeric ingredient comprising at least 70 percent vinylidene chloride is polymerized in the presence of a perhalomethane compound having the general formula Y—C—$X_3$ wherein Y is a halogen atom selected from the group consisting of bromine and iodine and each X may be any halogen. As typical examples of useful perhalomethane compounds may be mentioned carbon tetrabromide, bromotrichloromethane, dibromodichloromethane, chlorotribromomethane, bromotrifluoromethane, dibromodifluoromethane, fluorotribromomethane, bromochlorodifluoromethane, carbon tetraiodide, bromotriiodomethane, dibromodiiodomethane, iodotribromomethane, chlorotriiodomethane, dichlorodiiodomethane, iodotrichloromethane, fluorotriiodomethane, difluorodiiodomethane, and iodotrifluoromethane.

The amount of the perhalomethane that may be employed in the process of this invention may be varied from 0.05 to 5.0 percent by weight based on the weight of the monomer. The preferred concentration is from 1 to 3 percent by weight based on the weight of the monomer. When less than 0.05 percent is used the amount of molecular weight lowering is not usually great enough for practical purposes. When more than 5.0 percent is used no additional benefits are realized. When the compounds are used in these concentrations a substantial lowering of molecular weight of the polymers occurs without the necessity of altering polymerization conditions, and without significant decrease in polymerization rate.

Any of the known methods of polymerization may be employed in this process (mass, aqueous emulsion, aqueous suspension, or solution), although especially advantageous results are obtained when the common non-emulsified aqueous suspension method is used. In such method a water-dispersible granulating agent is usually employed and the effectiveness of that agent varies with the temperature. In addition, such methods employ oil-soluble catalysts having a relatively narrow temperature range of catalytic effectiveness. Thus, the temperature at which a suspension polymerization may be conducted is within a relatively narrow range. Those requirements are not nearly so rigid when emulsion polymerization techniques are employed, although the process of this invention may likewise be used.

The perhalomethane may be added to the polymerization charge in any manner, although to secure the most uniform results when polymerizing in an aqueous medium it is preferred to add it to the monomer before dispersing the monomer in the aqueous phase. In that way the perhalomethane will be evenly distributed throughout monomer droplets.

The perhalomethanes as defined above are effective in producing lower molecular weight vinylidene chloride polymers and are particularly effective with polymers comprising at least 70 percent vinylidene chloride and the remainder as vinyl chloride, and do not appreciably alter the rate of polymerization. With polymers containing more than 30 percent vinyl chloride, the rate of polymerization is retarded. This was most surprising in view of the results obtained with perhalomethanes containing no bromine or iodine and with compounds such as chloroform or bromoform which contain a hydrogen atom. In compounds of the latter two classes there is either no molecular weight lowering or there is a serious retardation of the rate of polymerization.

The molecular weight of the vinylidene chloride copolymers, such as are prepared by the process of this invention, is indicated by a measurement of the solution viscosity of a 2 percent solution of copolymer in orthodichlorobenzene at 120° C. That method has been employed for a long time in the vinylidene chloride copolymer art and has been especially valuable in screening large numbers of copolymers to check their relative molecular weight. The determination of the absolute molecular weight of any given copolymer is a difficult task and subject to considerable error and such an absolute molecular weight is important only insofar as it affects the flow viscosity of the molten polymer. The molten flow viscosity or the resistance to flow of a given copolymer is the property which determines the ease or difficulty of extruding or molding that copolymer. In evaluating results of solution viscosity determinations a minor change in value may indicate a substantial change in molecular weight and consequently in flow viscosity.

The process of the invention will be more apparent from the following illustrative examples in which all parts are by weight.

EXAMPLE 1

Several polymerization charges were prepared by adding to 160 parts of an aqueous phase containing 0.24 part of methyl cellulose (400 cps. grade) an oil phase consisting of 68 parts of vinylidene chloride, 12 parts vinyl chloride, 0.3 part lauroyl peroxide and varying amounts of the perhalomethane compounds of this invention, or of previously known chain transfer agents. Polymerization was initiated by warming the charges to 65° C. and maintaining them at that temperature for 47 hours, with continuous agitation to maintain dispersion. The polymer was isolated by filtration and air dried. The molecular weight of the polymers was compared by measuring the solution viscosity of a 2 percent solution of each polymer in o-dichlorobenzene at 120° C. in an Ostwald viscosimeter. The results are tabulated in Table I.

Table I

| Agent | Parts Agent | Percent Conversion | Solution Viscosity (cps.) |
|---|---|---|---|
| None | | 87.7 | 0.92 |
| Lauryl mercaptan (for comparison) | 0.5 | 79.0 | 0.78 |
| Carbon tetrachloride (for comparison) | 1.5 | 88.0 | 0.91 |
| Chlorodibromomethane (for comparison) | 0.5 | 92.3 | 0.91 |
| Bromochloromethane (for comparison) | 0.5 | 90.0 | 0.94 |
| Bromoform (for comparison) | 0.5 | 90.5 | 0.92 |
| Carbon tetrabromide | 0.4 | 87.2 | 0.84 |
| Bromotrichloromethane | 0.4 | 87.5 | 0.87 |
| Dibromodichloromethane | 0.4 | 85.6 | 0.87 |
| Fluorotribromomethane | 0.5 | 85.3 | 0.80 |
| Iodotrichloromethane | 0.5 | 79.6 | 0.80 |
| Dibromodifluoromethane | 1.5 | 94.2 | 0.87 |

From the above results it can be seen that lauryl mercaptan provides a substantial reduction in solution viscosity but as is generally true with mercaptans in these polymers, the heat stability of the polymer is appreciably lowered. Carbon tetrachloride, bromoform and chlorodibromomethane provide a satisfactory polymerization rate but have no effect on the solution viscosity. In contrast, the perhalomethanes of this invention provide both a satisfactory rate of polymerization and an appreciable reduction in solution viscosity.

EXAMPLE 2

A series of polymerization charges was prepared in a similar manner to that given in Example 1. Polymerization was initiated by warming the charges to 60° C. and maintaining them at that temperature until they had reached about 80 percent conversion. The polymer was dried and solution viscosities determined with the results listed in Table II.

Table II

| Agent | Percent Agent | Solution Viscosity (cps.) |
|---|---|---|
| None | | 0.95 |
| Carbon tetrabromide | 0.05 | 0.91 |
| Do | 0.10 | 0.89 |
| Do | 0.20 | 0.87 |
| Do | 0.50 | 0.81 |
| Do | 1.0 | 0.72 |
| Do | 1.4 | 0.65 |

We claim:

1. A process for controlling the molecular weight of vinylidene chloride polymers comprising the steps of first preparing a polymerizable ingredient comprising from 95 to 99.95 percent by weight of a monomer containing at least 70 percent by weight of vinylidene chloride with the balance vinyl chloride and correspondingly from 5.0 to 0.05 percent by weight of perhalomethane having the general formula $$Y\!-\!C\!-\!X_3$$

wherein Y is a halogen atom selected from the group consisting of bromine and iodine and each X may be any halogen atom and thereafter dispersing said polymerizable ingredient in an aqueous phase containing a water-soluble cellulose ether as granulating agent, subjecting the so-formed dispersion to thermal and catalytic conditions known to induce polymerization.

2. The process as claimed in claim 1 wherein the perhalomtehane is carbon tetrabromide.

3. The process as claimed in claim 1 wherein the perhalomethane is bromotrichloromethane.

4. The process as claimed in claim 1 wherein the perhalomethane is dibromodichloromethane.

5. The process as claimed in claim 1 wherein the perhalomethane is dibromodifluoromethane.

6. The process as claimed in claim 1 wherein the perhalomethane is fluorotribromomethane.

References Cited in the file of this patent

UNITED STATES PATENTS

| 2,647,107 | Barnes | July 28, 1953 |
| 2,729,627 | Carr | Jan. 3, 1956 |
| 2,740,772 | Alfrey | Apr. 3, 1956 |
| 2,752,331 | Dittman et al. | June 26, 1956 |
| 2,830,097 | Gavlin et al. | Apr. 8, 1958 |